(12) United States Patent
Urata et al.

(10) Patent No.: US 6,878,762 B2
(45) Date of Patent: Apr. 12, 2005

(54) POLYAMIDE RESIN COMPOSITION HAVING EXCELLENT WEATHER RESISTANCE

(75) Inventors: Yoshihiro Urata, Ube (JP); Tetsuya Yasui, Ube (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 10/247,880

(22) Filed: Sep. 20, 2002

(65) Prior Publication Data
US 2003/0065065 A1 Apr. 3, 2003

(30) Foreign Application Priority Data
Sep. 26, 2001 (JP) ........................................ 2001-293121

(51) Int. Cl.[7] .................... C08G 65/333; C08G 65/331
(52) U.S. Cl. ........................ 524/102; 524/99; 524/538
(58) Field of Search ........................... 524/99, 102, 538

(56) References Cited

FOREIGN PATENT DOCUMENTS

| EP | 0675160 A2 | 10/1994 | ............ C08K/5/00 |
|----|-----------|---------|----------------------|
| EP | 0816442 A2 | 6/1997 | ............ C09D/5/03 |
| EP | 0 927 743 A1 | 7/1999 | |
| JP | 48-93652 | 12/1973 | |
| JP | 2-229853 | 9/1990 | |
| JP | 5-93134 | 4/1993 | |
| JP | 7-103330 | 11/1995 | |
| JP | 10-182874 | 7/1998 | |
| JP | 10182874 A | 7/1998 | |
| JP | 261904 A | 9/2001 | |
| RU | 2144050 C | 1/2000 | |

OTHER PUBLICATIONS

"UV Stabilized Polyolefin Products Containing Hindered Amine Light Stabilizers and Hindered Benzonates", Retrieved from STN Database accession No. 135:304556, XP002227885.

Ling, Hui, "Antiageing of Hindered Amine on Polypropylene", Retrieved from STN Database accession No. 130:252953, XP002227886.

*Primary Examiner*—Ana Woodward
(74) *Attorney, Agent, or Firm*—Piper Rudnick LLP

(57) ABSTRACT

A polyamide resin composition, with a sufficiently high weather resistance even when the polyamide resin contains a pigment containing a metal component such as titanium oxide, or a residual catalyst containing a metal component, is provided by a polyamide resin composition comprising from 0.05 to 2 parts by weight of an N—O—R type low-molecular-weight hindered amine light-resistant stabilizer and a high-molecular-weight hindered amine light-resistant stabilizer per 100 parts by weight as a total of the composition.

9 Claims, 1 Drawing Sheet

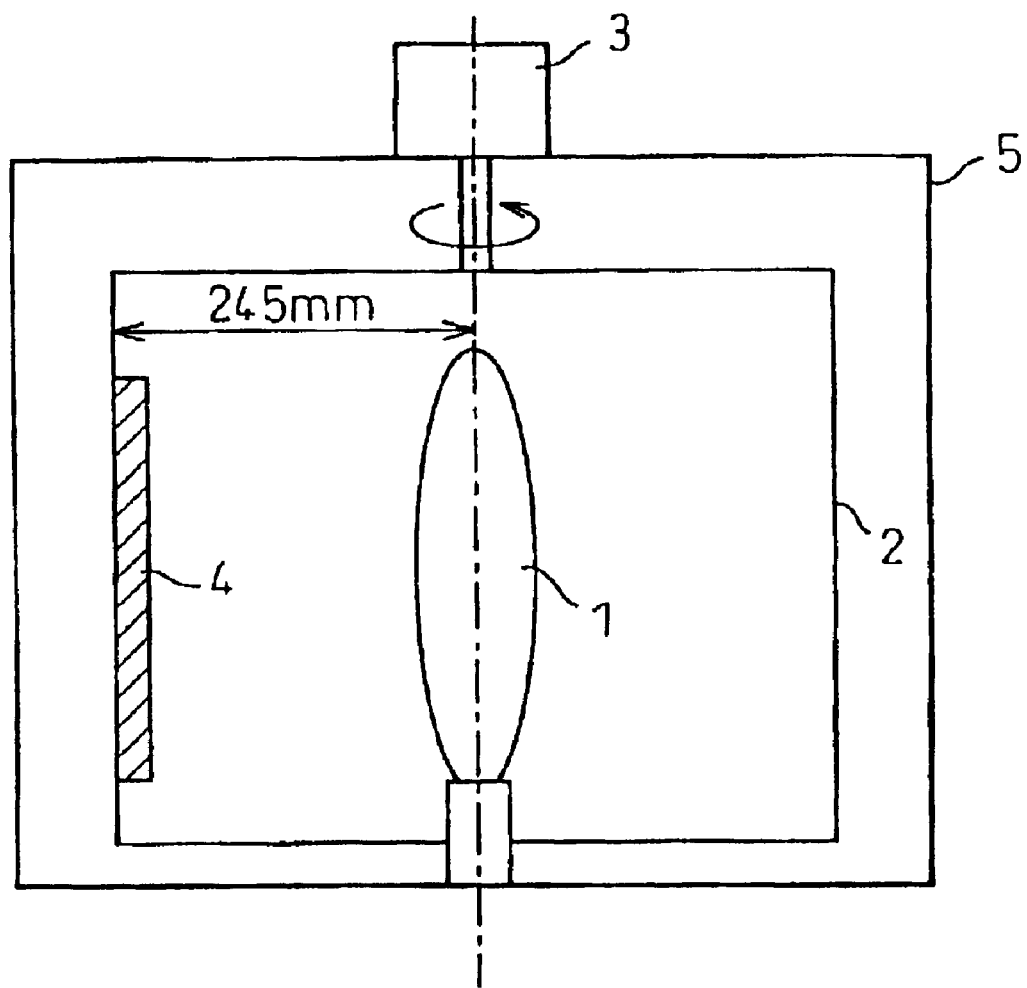

POLYAMIDE RESIN COMPOSITION HAVING EXCELLENT WEATHER RESISTANCE

FIELD OF THE INVENTION

The present invention relates to a polyamide resin composition having excellent weather resistance in an outdoor environment or after exposure to ultraviolet light and being suitable for exterior materials of automobiles, railways; parts of buildings, housing facilities, lighting devices and the like.

BACKGROUND ART

Polyamide resin is characterized by excellent mechanical properties, mold-processability and chemical resistance and therefore, is being widely used for automobile parts, electronic/electrical parts, mechanical parts, building materials, housing facility-related parts and the like. However, polyamide resin is extremely susceptible to oxidation deterioration and, accompanying a decrease in the polymerization degree, undesired phenomenan occur, such as reduction in mechanical strength, and generation of cracks and coloring on the surface. This oxidation deterioration is accelerated particularly by heat or light. Therefore, use of the polyamide resin is limited outdoors.

For the purpose of preventing such deterioration phenomena, a technique of adding various stabilizers to the polyamide resin is disclosed in Japanese Unexamined Patent Publication (Kokai) Nos. 48-93652 and 2-229853. However, their effect of improving the weather resistance is not satisfactory.

On the other hand, Japanese Examined Patent Publication (Kokoku) No. 7-103330 discloses a polyamide resin composition, improved in weather resistance, in which a hindered phenol-base heat-resistant agent, a triazole-base ultraviolet absorber and a hindered amine-base light-resistant stabilizer are blended to a specific polyamide. Japanese Unexamined Patent Publication No. 5-93134 discloses a weather-resistant composition in which a triazole-base ultraviolet absorber, a hindered amine-base light-resistant stabilizer, an alkali metal halide salt and a copper iodide are blended with a specific polyamide. Japanese Unexamined Patent Publication (Kokai) No. 10-182874 discloses a long-life weather-resistant polymer resin composition comprising polyamide 11 and/or polyamide 12, a hindered phenol heat resistant agent, a phosphorus-base working stabilizer, a triazole ultraviolet absorber, and low molecular weight and high molecular weight hindered amine light resistant agents.

In these methods, the weather resistance is improved by using an ultraviolet absorber (UVA) and a hindered amine-base light-resistant stabilizer in combination. However, when the polyamide resin composition contains a metal component, for example, in the case of a color grade polyamide resin composition using a pigment containing a metal component such as titanium oxide, or a polyamide resin composition containing a residual catalyst from the polymerization of resin, the metal component reacts with a UVA to form a complex and therefore, the synergistic effect for light resistance of UVA cannot be obtained. Thus, use of these methods is limited.

The object of the present invention is to solve the above-described problems and provide a polyamide resin composition capable of sufficiently exerting high weather resistance even when the polyamide resin contains a pigment containing a metal component such as titanium oxide, or a residual catalyst containing a metal component.

SUMMARY OF THE INVENTION

As a result of extensive investigations to solve those problems, the present inventors have found that the above-described object can be attained by using an N—O—R type low molecular hindered amine light-resistant stabilizer and a high molecular weight hindered amine light-resistant stabilizer in combination. The present invention has been accomplished based on this finding.

More specifically, the present invention relates to a polyamide resin composition having excellent weather resistance, comprising from 0.05 to 2 parts by weight of a combination of an N—O—R type low molecular weight hindered amine light-resistant stabilizer and a high molecular weight hindered amine light-resistant stabilizer per 100 parts by weight as a total of the composition said high molecular weight hindered amine light-resistant stabilizer having a molecular weight higher than that of said low molecular weight hindered amine light-resistant stabilizer, said N—O—R type low molecular weight hindered amine light-resistant stabilizer being a compound having a structure shown by the following formula within the molecule:

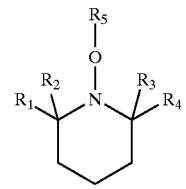

wherein $R_1$, $R_2$, $R_3$ and $R_4$ each represents an alkyl group and $R_5$ represents an alkyl group, a cycloalkyl group or an aryl group.

The present invention also relates to a polyamide resin composition having excellent weather resistance, comprising from 0.05 to 2 parts by weight per 100 parts by weight as a total of the composition, of a combination of an N—O—R type low molecular weight hindered amine light-resistant stabilizer and a high molecular weight hindered amine light-resistant stabilizer and from 0.2 to 7 parts by weight per 100 parts by weight as a total of the composition, of a pigment containing a metal component, said high molecular weight hindered amine light-resistant stabilizer having a molecular weight higher than that of said low molecular weight hindered amine light-resistant stabilizer, said N—O—R type low molecular weight hindered amine light-resistant stabilizer being a compound having a structure shown by the following formula within the molecule:

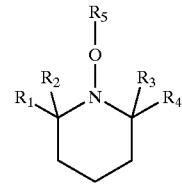

wherein $R_1$, $R_2$, $R_3$ and $R_4$ each represents an alkyl group and $R_5$ represents an alkyl group, a cycloalkyl group or an aryl group.

BRIEF DESCRIPTION OF DRAWING

FIG. 1 is a schematic view of an oven apparatus used in the weather resistance test.

MODES FOR CARRYING OUT THE INVENTION

The present invention is described in detail below.

The polyamide resin constituting the composition of the present invention may be a known polyamide resin. Examples thereof include various polyamide resins such as a polycondensate of lactam, a polycondensate of a diamine compound and a dicarboxylic acid compound, and a polycondensate of an w-aminocarboxylic acid.

Examples of the monomer component for the above-described polyamide resins include aliphatic or aromatic diamines having from 4 to 12 carbon atoms and aliphatic or aromatic dicarboxylic acids having from 6 to 12 carbon atoms, or, lactams having from 6 to 12 carbon atoms or aminocarboxylic acids having from 6 to 12 carbon atoms.

Specific examples of the aliphatic diamine include tetramethylenediamine, hexamethylenediamine, octamethylenediamine, nonamethylenediamine, undecamethylenediamine and dodecamethylenediamine.

Specific examples of the aromatic diamine include meta-xylylenediamine.

Specific examples of the aliphatic dicarboxylic acid include adipic acid, heptanedicarboxylic acid, octanedicarboxylic acid, nonanedicarboxylic acid, undecanedicarboxylic acid and dodecanedicarboxylic acid.

Specific examples of the aromatic dicarboxylic acid include terephthalic acid, isophthalic acid and naphthalenedicarboxylic acid.

Specific examples of the lactam include α-pyrrolidone, ε-caprolactam, ω-laurolactam and ε-enantholactam.

Specific examples of the aminocarboxylic acid include 6-aminocaproic acid, 7-aminoheptanoic acid, 11-aminoundecanoic acid and 12-aminododecanoic acid.

Specific examples of the polyamide resin formed from such monomer components include nylon 6, nylon 66, nylon 12, nylon 610, nylon 6I, nylon 6T and nylon M6. Also, copolymer polyamides thereof, such as nylon 6/66, nylon 66/610, nylon 66/6I and nylon 66/6T, and blended materials thereof may be used.

In the present invention, the polyamide resin is preferably a copolymer polyamide. By using a copolymer polyamide, high mechanical properties, particularly, high retention of elongation, can be obtained.

The polymerization degree of the polyamide resin for use in the present invention is not particularly limited but when 1 g of the polymer is dissolved in 100 ml of 96% concentrated sulfuric acid, the relative viscosity measured at 25° C. is preferably from 1.8 to 5.0, more preferably from 2.0 to 3.0. If the relative viscosity exceeds the upper limit of the above-described range, the workability is seriously impaired, whereas if it is less than the lower limit, the mechanical strength disadvantageously decreases.

In the polyamide resin for use in the present invention, the amino terminal group concentration is preferably higher than the carboxyl terminal group concentration. The amino terminal group concentration is desirably 50 milli-equivalent or more, preferably 60 milli-equivalent or more, per 1 kg of the polymer. By the excess amino terminal group concentration, high mechanical properties, particularly, high retention of elongation, can be obtained.

The method for producing a polyamide resin where the amino terminal group concentration is higher than the carboxyl terminal group concentration is not particularly limited but such a polyamide resin can be obtained by incorporating a diamine compound during the polymerization or at the time of extrusion-kneading the composition after the completion of polymerization. In the case of production at the melt-polymerization, there may be used a method of adding a diamine monomer in excess at the charging of starting materials and then polymerizing the monomers, a method of adding starting material monomers and a diamine compound other than the starting material monomer at the charging of starting materials and then polymerizing these, or a method of polymerizing a polyamide to a predetermined molecular weight and immediately before drawing out the polymer from the polymerization tank, adding a diamine compound to give an objective balance of terminal group concentrations. In the case of production after the polymerization, a method of mixing and melt-kneading a post polymerization polyamide resin and a diamine compound to give an objective balance of terminal group concentrations may be used.

Specific examples of the diamine compound include, in addition to those described above as the monomer of the polyamide resin, aliphatic diamines such as methylenediamine, ethylenediamine and trimethylenediamine, and aromatic diamines such as naphthalenediamine and meta-xylylenediamine. Preferred are hexamethylenediamine, dodecamethylenediamine and meta-xylylenediamine.

The polyamide resin composition of the present invention comprises 0.05 to 2 parts by weight of a combination of an N—O—R type low molecular hindered amine light-resistant stabilizer and a high molecular weight hindered amine light-resistant stabilizer, per 100 parts by weight as a total of the composition.

If the total amount of the combination of the low and high molecular hindered amine-base light-resistant stabilizers is less than 0.05 part by weight, insufficient weather resistance results, whereas if it exceeds 2 parts by weight, troubles such as bleeding out are disadvantageously caused.

The weight ratio of the N—O—R type low molecular weight hindered amine light-resistant stabilizer to the high molecular weight hindered amine light-resistant stabilizer is suitably from 1:10 to 10:1 (low molecular weight type : high molecular weight type), preferably from 1:3 to 3:1.

In the present invention, the low molecular weight hindered amine light-resistant stabilizer has an average molecular weight of 300 to less than 1,000, preferably from 400 to 800.

The high molecular weight hindered amine light-resistant stabilizer has an average molecular weight of 1,000 to 5,000, preferably from 1,500 to 4,000.

The N—O—R type low molecular weight hindered amine light-resistant stabilizer for use in the present invention is a compound having a structure shown by the following formula within the molecule:

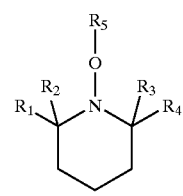

wherein $R_1$, $R_2$, $R_3$ and $R_4$ each represents an alkyl group and $R_5$ represents an alkyl group, a cycloalkyl group or an aryl group.

Examples of the N—O—R type low molecular weight hindered amine light-resistant stabilizer include the compound represented by the following formula (1):

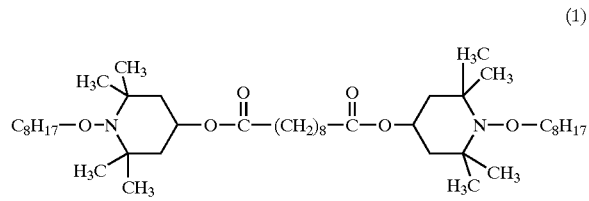

(1)

Examples of the high molecular weight hindered amine light-resistant stabilizer include dimethyl succinate-1-(2-hydroxyethyl)-4-hydroxy-2,2,6,6-tetramethylpiperidine polycondensate, poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, and poly[(6-morpholine-s-triazine-2,4-diyl){(2,2,6,6-tetramethyl-4-piperidyl)imino}hexamethylene{(2,2,6,6-tetramethyl-4-piperidyl)imino}].

In the present invention, an N—O—R type low molecular weight hindered amine light-resistant stabilizer and a high molecular weight hindered amine light-resistant stabilizer are used in combination, whereby an effect of the light resistance equal to or greater than that attained by the combination use of UVA and a hindered amine light-resistant stabilizer can be obtained.

The reasons therefor are as follows. The high molecular weight hindered amine light-resistant stabilizer provides light stability for a long period of time but, by the sole use thereof, the reaction for providing the light resistance proceeds slowly and therefore, the light-resistant effect does not appear quickly. On the other hand, the N—O—R type low molecular weight hindered amine light-resistant stabilizer exerts the light-resistant activity quickly as compared with general N—H type hindered amine light-resistant stabilizers but the effect cannot be expected to continue for long. By using these two stabilizers in combination, the light-resistant activity can be quickly exerted and at the same time, the light stability can be provided for a long period of time.

In the polyamide resin composition of the present invention, other fillers or additives may be added according to the properties required, such as a glass fiber, an inorganic pigment, an inorganic filler, a heat-resistant agent, a crystal nucleus agent, a crystallization accelerator, an antistatic agent, a flame retarder, a lubricant, a plasticizer, a foaming agent, a coloring agent, a stabilizer and a coupling agent.

Examples of the inorganic pigment which can be used include titanium dioxide, carbon black, iron oxide and ultramarine. These may be used individually or in combination. In particular, for white resin parts of lighting apparatus and the like, titanium dioxide is preferred. The particle size of titanium dioxide is not particularly limited and the crystal form may be either rutile or anatase. The titanium oxide is preferably surface-coated with a compound of Mn, Al, Zn, Si or the like.

The amount of the inorganic pigment added is preferably from 0.2 to 7 parts by weight per 100 parts by weight as a total of the composition. In the present invention, the inorganic pigment also has an effect of light discoloration resistance.

Examples of the heat-resistant agent include hindered phenols, phosphites and copper halides. These may be used individually or in combination.

Examples of hindered phenols include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis(n-octylthio)-6-(4-hydroxy-3,5-di-tert-butylanilino)-1,3,5-triazine, pentaerythrityl-tetrakis[3-(3,5-di-tert-butyl-4-hydroxyphenyl)propionate], 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxy-hydrocinnamide), 3,5-di-tert-butyl-4-hydroxy-benzylphosphonate-diethyl ester and 1,3,5-trimethyl-2,4,6-tris(3,5-di-tert-butyl-4-hydroxybenzyl)benzene. Among these, preferred are triethylene glycol-bis[3-(3-tert-butyl-5-methyl-4-hydroxyphenyl)propionate], pentaerythrityl-tetrakis[3-(3,5-di-tert-butyl-4-hydroxyphenyl)propionate] and N,N'-hexamethylenebis(3,5-di-tert-butyl-4-hydroxy-hydrocinnamide).

Examples of phosphites include tris(2,4-di-tert-butylphenyl)phosphite and tetrakis(2,4-di-tert-butylphenyl)-4,4'-biphenylene phosphonite.

The amount of the heat-resistant agent added is preferably from 0.01 to 1 part by weight per 100 parts by weight as a total of the composition.

Examples of the crystal nucleus agent include inorganic fillers such as talc and clay, and organic crystal nucleus agents such as fatty acid metal salt. These can be used individually or in combination.

Examples of the crystallization accelerator include low molecular weight polyamides, higher fatty acids, higher fatty acid esters and higher aliphatic alcohols. These may be used individually or in combination.

Examples of the release agent include fatty acid metal salts, fatty acid amides and various waxes. These may be used individually or in combination.

Examples of the antistatic agent include aliphatic alcohols, aliphatic alcohol esters and higher fatty acid esters. These may be used individually or in combination.

Examples of the flame retarder include metal hydroxides such as magnesium hydroxide, phosphorus, ammonium phosphate, ammonium polyphosphate, melamine cyanurate, ethylenedimelamine dicyanurate, potassium nitrate and chlorine-base flame retarders. These may be used individually or in combination.

In the polyamide resin of the present invention, another thermoplastic resin can be added within the range of not impairing the object of the present invention. Examples of the thermoplastic resin used in combination include general-purpose resin materials such as polyethylene, polypropylene, polystyrene, ABS resin, AS resin and acrylic resin, polycarbonate, polyphenylene oxide, polyethylene terephthalate, polybutylene terephthalate, polyphenylene sulfide and other highly heat-resistant resins. Particularly, in the case of using polyethylene or polypropylene in combination, such a resin is preferably used after modifying it, for example, with a maleic acid anhydride or a glycidyl group-containing monomer.

The polyamide resin composition of the present invention is suitably used for exterior materials of automobiles or railways, parts of building materials, housing facilities, lighting devices and the like.

EXAMPLES

The present invention is described in greater detail below by referring to Examples and Comparative Examples, however, the present invention is not limited thereto.

[Mechanical Properties]

According to ASTM D638, an ASTM No. I specimen was prepared by injection molding and the tensile strength and the tensile elongation of the specimen were measured. By comparing the properties before and after the weather resistance treatment, the degree of reduction in the physical properties due to the weather resistance treatment was evaluated.

[ΔE (Color Difference)]

According to JIS Z8730, an ASTM No. I specimen was prepared by injection molding and subjected to a weather resistance treatment. L*, a* and b* of the specimen were measured using SM Color Computer SM5 manufactured by Suga. From respective differences in L*, a* and b* of the specimen measured before and after the weather resistance treatment, the color difference due to the weather resistance treatment $\Delta E=(\Delta L^{*2}+\Delta a^{*2}+\Delta b^{*2})^{0.5}$ was calculated. Based on the results, the change in color tone before and after the weather resistance treatment was evaluated.

[Compositions Used in Examples and Comparative Examples]

PA6-1:
1013B produced by Ube Industries, Ltd. (amino terminal group concentration: $4.5 \text{ eq/g} \times 10^{-5}$, carboxyl terminal group concentration: $6.5 \text{ eq/g} \times 10^{-5}$)

PA6-2:
1013A produced by Ube Industries, Ltd. (amino terminal group concentration: $9.7 \text{ eq/g} \times 10^{-5}$, carboxyl terminal group concentration: $2.6 \text{ eq/g} \times 10^{-5}$)

PA6/66:
5013B produced by Ube Industries, Ltd.

Heat-Resistant Agent:
TOMINOX 917 (hindered phenol-base, produced by Yoshitomi Pharmaceutical Industries, Ltd.)

Heat-Resistant Agent:
Irganox 1098 (hindered phenol-base, produced by Ciba Specialty Chemicals)

Heat-Resistant Agent:
Irgafos 168 (phosphite-base, produced by Ciba Specialty Chemicals)

Heat-Resistant Agent:
Sandostab P-EPQ (phosphonite-base, produced by Clariant)

Ultraviolet Absorber:
Tinuvin 327 (benzotriazole-base, produced by Ciba Specialty Chemicals)

Ultraviolet Absorber:
Tinuvin 234 (benzotriazole-base, produced by Ciba Specialty Chemicals)

Ultraviolet Absorber:
Sanduvor VSU (oxalic acid anilide-base, produced by Clariant)

Weather-Resistant Agent:
Tinuvin 770 (N—H type hindered amine-base, molecular weight: 481, produced by Ciba Specialty Chemicals)

Weather-Resistant Agent:
Tinuvin 123 (N—O—R type hindered amine-base, molecular weight: 737, produced by Ciba Specialty Chemicals)

Weather-Resistant Agent:
Chimassorb 944 (N—H type hindered amine-base, molecular weight: 2,000 or more, produced by Ciba Specialty Chemicals)

Weather-Resistant Agent:
Chimassorb 119 (N—R type hindered amine-base, molecular weight: 2,000 or more, produced by Ciba Specialty Chemicals)

Pigment:
Titanium Oxide KR-480 (titanium dioxide, produced by Titan Kogyo Kabushiki Kaisha)

Examples 1 to 7 and Comparative Examples 1 to 5

Each composition shown in Table 1 was preliminarily mixed by dry blending and melt-kneaded using TEM 35B manufactured by Toshiba Machine Co., Ltd. to prepare pellets.

Each prepared sample was molded into an ASTM No. I specimen using a NESTAL SG75 manufactured by Sumitomo Heavy Industries, Ltd.

The obtained ASTM No. I specimens were measured on the tensile strength and the tensile elongation.

Then, the obtained ASTM No. I specimens were subjected to a weather resistance test using an oven apparatus shown in FIG. 1 (Temperature Chamber MODEL PS-22, manufactured by TABAIESPEC).

In FIG. 1, the mercury lamp 1 used was Mercury Lamp H400, the distance from the center of mercury lamp 1 to the jig 2 on the inside surface of which the specimen 4 was set was 245 mm, the rotation number of motor 3 was 60 rpm, the temperature within the system (Temperature Chamber MODEL PS-22 manufactured by TABAIESPEC) 5 was 90° C., and the acceleration test was performed for 7 days or 14 days.

Samples after the test were measured on the tensile strength, the tensile elongation and ΔE (color difference). In this case, ΔE indicates the difference (color difference) from the sample not subjected to the acceleration test. The results obtained are shown in Table 1.

TABLE 1

| Composition (%) | Examples | | | | | | | Comparative Examples | | | | |
|---|---|---|---|---|---|---|---|---|---|---|---|---|
| | 1 | 2 | 3 | 4 | 5 | 6 | 7 | 1 | 2 | 3 | 4 | 5 |
| PA6-1 | 97.4 | | | | | | | 98.0 | 97.4 | 97.4 | 97.4 | |
| PA6-2 | | 97.4 | 97.3 | 97.3 | 97.4 | 97.0 | | | | | | 97.4 |
| PA6/66 | | | | | | | 97.4 | | | | | |
| CHIMASSORB 119 | 0.2 | 0.1 | 0.2 | 0.1 | 0.2 | 0.3 | 0.2 | | | 0.3 | 0.2 | 0.2 |
| CHIMASSORB 944 | | | | | | | | 0.3 | | | | |
| TINUVIN 123 | 0.2 | 0.1 | 0.1 | 0.2 | 0.2 | 0.3 | 0.2 | | | | | |
| TINUVIN 770 | | | | | | | | | | | 0.2 | |
| TINUVIN 327 | | | | | | | | | 0.1 | | | |
| TINUVIN 234 | | | | | | | | | | 0.1 | | |
| Sanduvor VSU | | | | | | | | | | | | 0.2 |
| TOMINOX 917 | | 0.1 | 0.1 | 0.1 | 0.1 | 0.1 | 0.1 | | | | | 0.1 |
| IRGANOX 1098 | 0.1 | | | | | | | 0.1 | 0.1 | 0.1 | | |
| IRGAFOS 168 | 0.1 | 0.3 | 0.3 | 0.3 | | 0.3 | | | 0.1 | 0.1 | 0.1 | |

TABLE 1-continued

| Composition (%) | Examples | | | | | | | Comparative Examples | | | | |
|---|---|---|---|---|---|---|---|---|---|---|---|---|
| | 1 | 2 | 3 | 4 | 5 | 6 | 7 | 1 | 2 | 3 | 4 | 5 |
| Sandostab P-EPO | | | | | 0.1 | | 0.1 | | | | | 0.1 |
| Titanium oxide | 2.0 | 2.0 | 2.0 | 2.0 | 2.0 | 2.0 | 2.0 | 2.0 | 2.0 | 2.0 | 2.0 | 2.0 |
| Blank | | | | | | | | | | | | |
| Tensile, average MPa | 75 | 77 | 76 | 75 | 77 | 76 | 70 | 75 | 71 | 73 | 74 | 76 |
| Elongation, average % | 210 | 230 | 225 | 220 | 230 | 230 | 230 | 206 | 191 | 201 | 207 | 225 |
| Treatment for 7 Days | | | | | | | | | | | | |
| Tensile, average MPa | 71 | 73 | 72 | 73 | 74 | 75 | 68 | 44 | 69 | 68 | 69 | 69 |
| Elongation, average % | 172 | 200 | 202 | 201 | 208 | 212 | 211 | 2 | 175 | 106 | 171 | 195 |
| ΔE | 2.2 | 4.0 | 3.9 | 3.8 | 3.6 | 3.5 | 4.5 | 15.1 | 6.7 | 7.0 | 11.3 | 4.2 |
| Treatment for 14 Days | | | | | | | | | | | | |
| Tensile, average MPa | 68 | 64 | 65 | 63 | 66 | 68 | 64 | 33 | 67 | 68 | 68 | 65 |
| Elongation, average % | 115 | 110 | 119 | 121 | 133 | 150 | 151 | 1 | 38 | 31 | 108 | 14 |
| ΔE | 7.8 | 7.5 | 7.1 | 7.0 | 6.2 | 5.8 | 8.0 | 19.1 | 8.5 | 9.1 | 13.5 | 7.9 |

The polyamide resin composition of the present invention provides sufficiently high weather resistance even when the polyamide resin contains a pigment containing a metal component such as titanium oxide, or a residual catalyst containing a metal component, and can be suitably used for exterior materials of automobiles or railways and parts of building materials, housing facilities, lighting fixtures or the like.

What is claimed is:

1. A polyamide resin composition having excellent weather resistance, comprising a polyamide resin and from 0.05 to 2 parts by weight of a combination of an N—O—R low-molecular-weight hindered amine light-resistant stabilizer and a high-molecular-weight hindered amine light-resistant stabilizer per 100 parts by weight of the composition, said high-molecular-weight hindered amine light-resistant stabilizer having a molecular weight higher than that of said low-molecular-weight hindered amine light-resistant stabilizer, said N—O—R low molecular weight hindered amine light-resistant stabilizer being a compound having a structure shown by the following formula within the molecule:

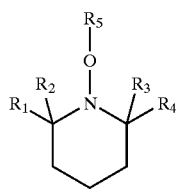

wherein $R_1$, $R_2$, $R_3$ and $R_4$ each represents an alkyl group and $R_5$ represents an alkyl group, a cycloalkyl group or an aryl group.

2. A polyamide resin composition having excellent weather resistance, comprising a polyamide resin, from 0.05 to 2 parts by weight, per 100 parts by weight of the composition, of a combination of an N—O—R low-molecular-weight hindered amine light-resistant stabilizer and a high-molecular-weight hindered amine light-resistant stabilizer, and from 0.2 to 7 parts by weight, per 100 parts by weight of the composition, of a pigment containing a metal component, said high-molecular-weight hindered amine light-resistant stabilizer having a molecular weight higher than that of said low-molecular-weight hindered amine light-resistant stabilizer, said N—O—R low-molecular-weight hindered amine light-resistant stabilizer being a compound having a structure shown by the following formula within the molecule:

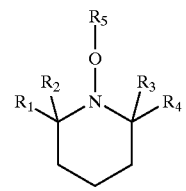

wherein $R_1$, $R_2$, $R_3$ and $R_4$ each represents an alkyl group and $R_5$ represents an alkyl group, a cycloalkyl group or an aryl group.

3. The polyamide resin composition as claimed in claim 2, wherein the metal component constituting the pigment contains titanium oxide.

4. The polyamide resin composition as claimed in claim 1 or 2, wherein the weight ratio of the N—O—R low-molecular-weight hindered amine light-resistant stabilizer to the high-molecular-weight hindered amine-base light-resistant stabilizer is from 1:10 to 10:1.

5. The polyamide resin composition as claimed in claim 1 or 2, wherein the N—O—R low-molecular-weight hindered amine light-resistant stabilizer is a compound represented by the following formula:

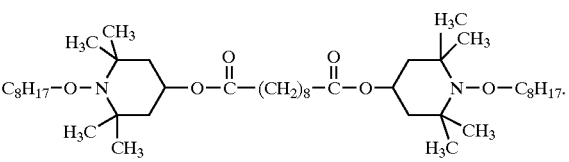

6. The polyamide resin composition as claimed in claim 1 or 2, wherein the polyamide resin is a copolymer polyamide resin.

7. The polyamide resin composition as claimed in claim 1 or 2, wherein in the polyamide resin, the amino terminal group concentration is higher than the carboxyl terminal group concentration.

8. The polyamide resin composition as claimed in claim 1 or 2, wherein said N—O—R low-molecular-weight hindered amine light-resistant stabilizer has a molecular weight of 300 to less than 1000, and said high-molecular-weight hindered amine light-resistant stabilizer has a molecular weight of 1000 to 5000.

9. The polyamide resin composition as claimed in claim 1 or 2, wherein said high-molecular-weight hindered amine light-resistant stabilizer is selected from the group consisting of dimethyl succinate-1-(2-hydroxyethyl)-4-hydroxy-2,2,6,6-tetramethylpiperidine polycondensate, poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, and poly[(6-morpholine-s-triazine-2,4-diyl){(2,2,6,6-tetramethyl-4-piperidyl)imino}hexamethylene{(2,2,6,6-tetramethyl-4-piperidyl)imino}].

* * * * *

UNITED STATES PATENT AND TRADEMARK OFFICE
CERTIFICATE OF CORRECTION

PATENT NO. : 6,878,762 B2
DATED : April 12, 2005
INVENTOR(S) : Urata et al.

It is certified that error appears in the above-identified patent and that said Letters Patent is hereby corrected as shown below:

<u>Column 3,</u>
Line 10, please change "w-aminocarboxylic" to -- ω-aminocarboxylic --.

Signed and Sealed this

Twenty-second Day of November, 2005

JON W. DUDAS
*Director of the United States Patent and Trademark Office*